United States Patent

Carlson

[15] 3,694,596

[45] Sept. 26, 1972

[54] THROTTLE KILL SWITCH

[72] Inventor: John A. Carlson, Wichita, Kans.

[73] Assignee: Conchemo, Incorporated, Kansas City, Mo.

[22] Filed: Oct. 1, 1971

[21] Appl. No.: 185,733

[52] U.S. Cl. .............................. 200/61.87, 200/157
[51] Int. Cl. ................................. H01h 9/06
[58] Field of Search..200/61.85, 61.87, 61.88, 61.89, 200/61.9, 61.91, 157

[56] References Cited

UNITED STATES PATENTS 3,273,552   9/1966   Plath .................. 200/61.89 X

Primary Examiner—Robert K. Schaefer
Assistant Examiner—M. Ginsburg
Attorney—Schmidt, Johnson, Hovey & Williams

[57] ABSTRACT

A rotating control lever and electrical switch for mobile vehicles wherein the pivot member for the lever is translationally movable to act as the electrical conducting switch. The pivot member is relatively loosely confined in the lever mounting bracket, and a pair of electrical conduits are secured to the bracket in spaced relation to make selective contact with the pivot member upon its translational movement. A spring engages the pivot to urge it translationally toward one of its switch positions, while selective rotation of the lever overrides the spring bias and moves the pivot translationally to another switch position.

8 Claims, 6 Drawing Figures

PATENTED SEP 26 1972

3,694,596

INVENTOR.
John A. Carlson
BY
Schmidt, Johnson, Hovey & Williams
ATTORNEYS.

THROTTLE KILL SWITCH

This invention relates to mechanical control levers having automatically operated electrical switching means associated therewith.

A highly important safety feature for mobile vehicles having extensive throttle control linkage actuated by hand or foot pedals, is the inclusion of an automatic safety switch that stops the engine whenever the throttle linkage malfunctions. Such an automatic kill switch can be considered requisite for certain type vehicles, such as snowmobiles having exposed hand control levers and linkage highly susceptible to freezing, sticking or breaking. The accelerator or throttle linkage normally includes a return spring urging the throttle to a closed or idling position; however, upon malfunction of the control linkage the return spring bias will be relieved and the throttle will remain in a fully open position.

To obviate this dangerous condition, therefore, it becomes highly desirable to provide an electrical switching arrangement that acts automatically, whenever the throttle malfunctions, to complete a circuit to ground or otherwise disable the engine ignition circuit and bring the vehicle to an emergency stop. Switches of the class described may also be used in other applications, such as automatically opening and closing brake light circuitry in response to actuation of the brake pedal.

Throughout the specification, the ignition circuitry is referred to as being "open" to denote the grounding or otherwise disabling condition of the ignition circuitry; and conversely, the ignition circuitry is described as being "closed" to denote the opposite, enabling or completed condition during which normal ignition and vehicle operation occurs.

A broad object of the invention is to provide an automatic safety switch of the character described which forms part of the control lever assembly.

It is an important object of the invention to provide automatic electrical switch means of the class described which operates both in response to actuation of mechanical control means and in response to malfunction of the latter means.

A more particular object of the invention is to provide a vehicle electrical ignition switch which operates automatically in response to malfunction of the vehicle control linkage.

A further object of the invention is to provide a rotatable accelerator control lever spring biased to an idling position, and an electrical switch automatically disabling or opening the engine ignition circuit upon failure of the spring to return the lever to the idling position.

A more particular object in accordance with the preceding object is to provide a control lever pivot member which is loosely contained within the lever mounting bracket so as to be translationally displaceable between positions opening and closing the ignition circuit, and spring means for normally urging said electrical conducting pivot member to a position closing the ignition circuit to permit operation of the vehicle engine.

Yet another object in accordance with the preceding object is to provide a tension spring control cable normally biasing the lever to its idling position and, upon positioning the lever near said position, urging the electrical conducting pivot member to a circuit closing position permitting operation of the vehicle engine.

Another object of the invention is to provide an electrical circuit switch in combination with a vehicle brake lever which automatically turns on the brake lights upon actuation of the brake lever.

Still a further object of the invention is to provide an electrical switch assembly of the class described which is simple and highly reliable in design.

Briefly, one form of the invention comprises a throttle control lever pivotally mounted upon a bracket base secured to the vehicle, with a control cable fastened to the lever and normally being under tension to bias the lever to an engine idling position. The lever pivots on a cylindrical bar loosely confined within an opening in the lever mounting bracket so as to be translationally movable in a plane containing the lever pivot axis. A pair of electrical conductors are secured upon the bracket and extend into the bracket opening so as to make and break contact with the electrical conducting pivot bar upon its translational movement. A spring member in the bracket urges the pivot bar translationally to a position contacting the electrical conductors so as to open the vehicle ignition circuit and prevent its operation. Upon selective rotation of the lever away from its idling position the lever urges the pivot bar translationally away from the conductors so as to close the ignition circuit and permit operation of the vehicle. The lever is arranged on the mounting bracket so that as it nears the idling position, the control cable tension acts against the spring and moves the pivot bar to the circuit closing position. Upon loss of the cable tension bias through malfunction, the biasing spring moves the pivot bar to a circuit opening position to stop the engine.

Other objects and advantages of the present invention are specifically set forth in or will become apparent from the following detailed description of preferred embodiments of the invention and the accompanying drawings, in which.

Figure 1:
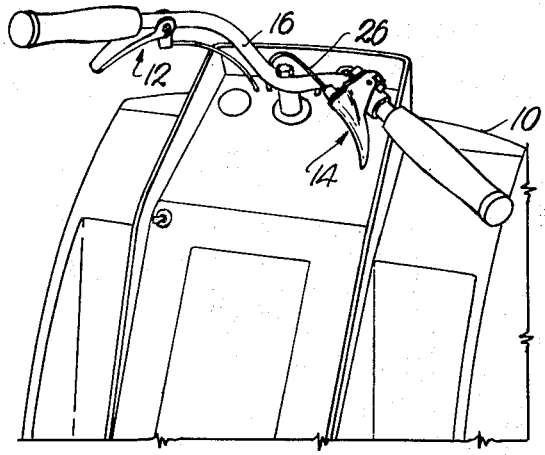
FIG. 1 is a fragmentary perspective view of a portion of a mobile vehicle utilizing the present invention.
Figure 2:
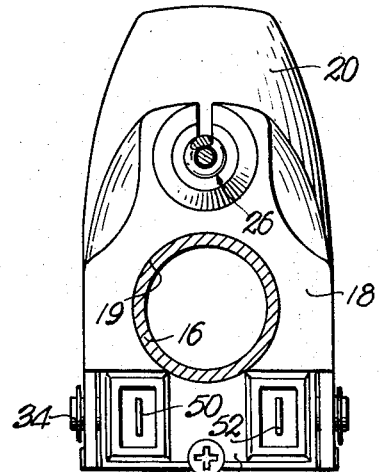
FIG. 2 is a front elevational view of one form of control lever and electrical switch assembly as contemplated by the present invention.
Figure 3:
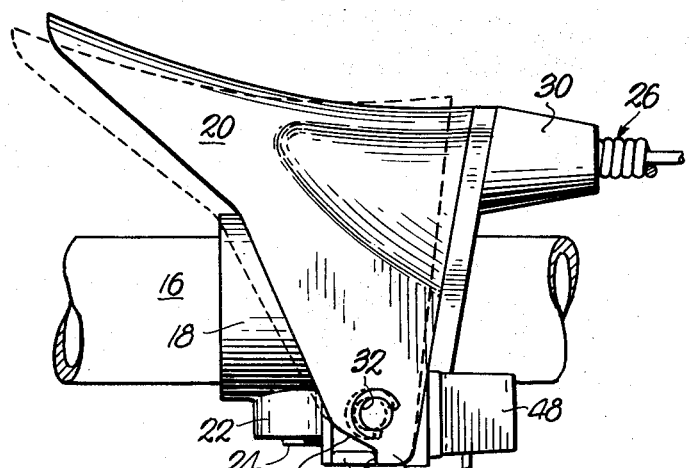
FIG. 3 is a side elevational view of the control lever and electrical switch assembly.
Figure 4:
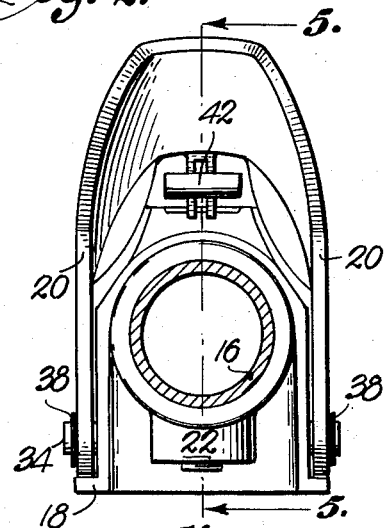
FIG. 4 is a rear elevational view of the control lever and electrical switch assembly.

FIG. 1 illustrates the forward end of a snowmobile 10 or the like having brake and throttle control levers 12 and 14 secured upon the steering handle bars 16. Referring to FIGS. 2–4, which illustrate the throttle control lever 14 in greater detail, the throttle control generally includes a mounting bracket 18 having a central opening 19 accepting the handle bar, and a lever 20 pivotally mounted upon bracket 18. The mounting bracket and lever are preferably molded of high impact, insulative plastic material. A boss 22 at the rear of the mounting bracket carries a set screw 24 which secures the bracket to the handle bar. A control cable 26 of the Bowden type is carried within an aperture 28 in a guide extension portion 30 formed on the front of bracket 18.

Figure 6:
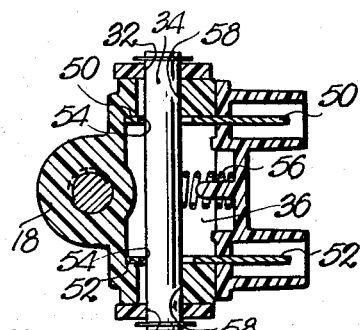
FIG. 6 is a transverse cross section as viewed along lines 6—6 of FIG. 6 of the electrical switch portion of the lever bracket.

Lever 20 is generally U-shaped with pivot accepting holes 32 aligned on opposite ends of the lever. As best seen in FIG. 6, a metal bar pivot 34 extends through the lever pivot openings 32 and an intermediate enlarged opening 36 in the bracket 18 enclosed on three sides by the lever. In the preferred form, pivot bar 34 is formed from a cylindrical stock of electrical conducting metal having good bearing characteristics, and is secured to lever 20 by conventional snap rings 38. Lever 20 is pivotal relative pivot bar 34 so as to rotate relative to the mounting bracket and displace the control cable 26 to selectively vary engine throttle and vehicle speed.

Figure 5:
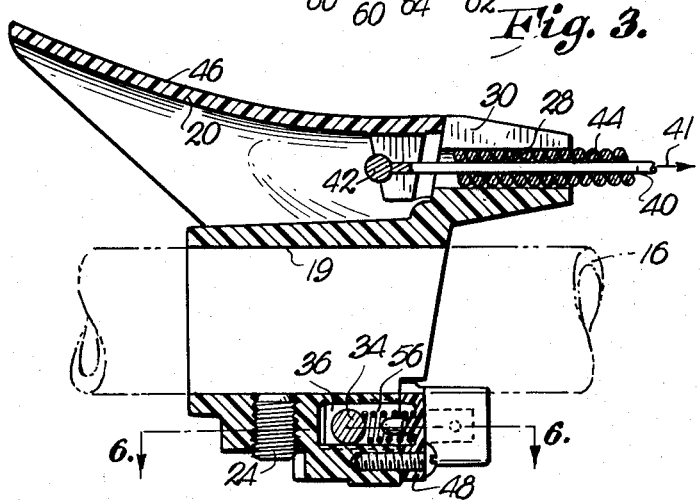
FIG. 5 is a longitudinal cross section viewed along lines 5—5 of FIG. 4.

Referring to FIG. 5, the control cable includes a control wire 40 engaging the lever at 42, and a spirally wound protective sheath 44 surrounding the wire. Through conventional linkage the control cable connects with the engine throttle control whereby upon counterclockwise rotation of lever 20, wire 40 is pulled leftwardly to increase engine speed. A throttle spring (not shown) is coupled with cable 26 to pull same rightwardly under a tension depicted by arrow 41, and thereby urge lever 20 to rotate clockwise about pivot bar 34 to an engine idle position where guide portion 30 of the mounting bracket stops the lever from farther clockwise rotation. Upon actuating the lever by applying operating forces to lever surface 46, the lever 20 rotates counterclockwise in opposition to the bias of this cable tension 41 to pull the control wire 40 leftwardly.

An electrical plug-in bracket 48 is mounted upon the lower front face of lever bracket 18 so as to accept spaced electrical current conducting metal strips 50 and 52 positioned to extend from the mounting bracket opening 36 so as to form terminals for connection into the engine ignition circuitry (not shown). In the preferred form, each electrical conductor has an enlarged opening accepting and surrounding the pivot bar 34, and has rearwardly positioned surfaces 54 in contactable relationship to pivot bar 34. A compression spring 56 is compressed between the electrical plug-in 48 and pivot bar 34 so as to bias the pivot bar toward contact with electrical conducting surfaces 54.

As shown in FIGS. 5 and 6, the bracket opening 36 loosely confines pivot bar 34 to permit translational movement of the bar from a position engaging front wall 58 as shown in FIG. 6, to a position contacting the conductor surfaces 54. Through this arrangement the pivot bar 34 is urged rightwardly against surface 58 whenever operating forces are applied to lever 20 to rotate same counterclockwise away from the idling position. In the absence of such operating forces, spring 56 urges pivot bar 34 the opposite direction into contact with the electrical conductors. Conductors 50 and 52 are arranged in the ignition circuitry in such a manner whereby closing the circuit between the two conductors completes a circuit to ground to "open" or disable the ignition to prevent engine operation, i.e., whenever the pivot bar is contacting surfaces 54, and permits normal engine operation when the circuits between the conductors are not closed, as whenever the pivot bar is in a position as shown in FIG. 6.

It will be apparent to those skilled in the art that the conductors may be differently connected within the ignition circuitry so that the circuit between conductors 50, 52 must be closed, rather than opened, to permit engine operation. It will also be apparent that for such arrangement the conductor contact surfaces 54 can be reversed and placed on the right side, rather than left side, of pivot bar 34 as viewed in FIG. 6. This one change will duplicate the operation described above, with the operating forces moving pivot bar 34 rightwardly again to an ignition-enabling position (making contact with the conductors) in opposition to the bias of spring 56 urging the bar leftwardly to an ignition-disabling position (breaking contact with the conductors).

Returning to the illustrated embodiment of the invention, a stop member 60 is incorporated on the lower portion of the lever mounting bracket 18 so as to provide a cam surface engaging a dog extension 62 of lever 20. The stop 60 is also engageable with lever surface 66 to limit counterclockwise lever rotation. The engagement of dog 62 and stop 60 permits normal operation of the engine in the idling position. Stop 60 engages the dog 62 below pivot bar 34 as viewed in FIG. 3, on the opposite side at which control cable wire 40 is secured to the lever, and is positioned to contact the lever as the latter rotates clockwise to near its idling position. Thus, upon release of lever 20, the bias tension 41 pulls the lever clockwise in rotation about pivot 34 toward the idling position until dog 62 engages stop 60. The bias of the control cable then continues pulling the lever clockwise, but rather about the point of contact 64 between the lever and stop member 60. The control cable accordingly forces pivot member 34 to move rightwardly and out of contact with conductor surfaces 54. The bias presented by the control cable tension normally holds the lever unattended in the idling position and holds the pivot bar in its FIG. 6 position to permit normal engine operation during idling.

Accordingly, during normal operation of the invention, the operating forces applied upon lever 20 will override the bias of pivot spring 56 and urge the pivot bar to the FIG. 6 position to close the ignition circuit and permit normal engine operation. Upon release of the handle, the cable control automatically returns to an idling position and its tension holds the pivot member out of contact with conductors 50 and 52 to again permit normal operation.

Upon malfunction of the tension control cable, its bias upon the lever will be relieved, and pivot spring 56 will push pivot bar 34 and the lever back leftwardly, to the position depicted in dashed lines in FIG. 3, into engagement with the conductors to stop the engine. The vehicle, therefore, automatically comes to an emergency stop whenever the tension control linkage malfunctions.

In the embodiment illustrated, the combined efforts of the operating forces and cable tension 41 normally hold pin 34 in its ignition-enabling position. Additionally, if desired, a detent mechanism may be incorporated to assist in holding the pin in this position. Such an arrangement, for instance a modified configuration of pivot holes 32 that presents a detent shoulder for selectively engaging the pin 34, would tend to reduce sensitivity of the switch in inadvertently moving the pin 34 to an ignition-disabling position during "jockeying"

of the throttle. The holding force exerted by such a detent would be less than the force of spring 56 so that the latter could still move the pin to kill the engine whenever the tension cable malfunctions.

The present arrangement of rotatable control lever and automatic electrical switch has fewer parts and is generally simpler in design, creating a switch highly reliable in operation, and durable in nature. This is accomplished primarily through utilizing a cylindrical pivot bar 34 which also acts as the electrical switch member. The generally loose confinement of pivot pin 34 within the mounting bracket reduces wear and increases part life. In a preferred form of the invention the combined electrical switch and pivot, conductors 50 and 52, and spring 56 are all encased within the mounting bracket 18 for protection.

The brake control lever 12, generally identical in design to throttle lever 14 and therefore not shown in detail, comprises another embodiment of the invention. In particular, brake control 12 is the same as throttle 14 except it has no engaging stop and dog members 60 and 62. By this arrangement the pivot biasing spring 56 continually urges the pivot bar leftwardly to a position opening the brake light circuitry (not shown) in the absence of application of operating forces on the brake lever. Upon actuating the brake control lever, the pivot pin 34 moves rightwardly to a position closing the brake light electrical circuitry so as to turn on warning lights whenever the brakes are applied.

The foregoing detailed description of preferred forms of the invention are to be considered exemplary in nature and not as limiting to the scope and spirit of the invention as set forth in the appended claims.

Having thus described the invention, what is claimed as new and desired to be secured by Letters Patent is:

1. In a control device having a rotatable actuating lever, control linkage secured to said lever so as to be displaced upon rotation of the lever away from a first position, and first biasing means operatively engaging said control linkage to urge the lever to rotate toward said first position, wherein the improvement comprises:
   an electrical conductor bar pivot member engaging said lever so as to provide a pivot therefor;
   a nonrotatable, insulative housing having an opening accepting said pivot bar member whereby said lever rotates relative to said housing, said opening being sufficiently large to permit limited translational displacement of said pivot bar member substantially in a plane containing the pivotal axis of said lever;
   a pair of electrical current conducting members affixed to said housing in contacting relation to said conductor bar pivot member, said bar pivot member being translationally movable between one position contacting said current conducting members to close a circuit therebetween and another position opening the circuit between said current conducting members; and
   second biasing means mounted in said housing and operatively engaging said conductor pivot bar member to urge the latter translationally toward one of said circuit opening and closing positions, said lever being operable upon rotation away from said first lever position to urge said pivot bar member translationally to the other of said circuit opening and closing positions in opposition to the urgings of said second biasing means.

2. The control device of claim 1, wherein said second biasing means urge said pivot member translationally toward said circuit closing position.

3. The control device of claim 1, wherein said second biasing means urge said pivot member translationally toward said circuit opening position.

4. The control device of claim 1, further comprising a stop member attached to said housing engaging said lever as the latter nears said first lever position and upon engagement providing a secondary pivot point for rotation of said lever, the control linkage and secondary pivot point being located on opposite sides of said translational displacement plane whereby, upon engagement of said lever and stop member, said lever is urged by said first biasing means to rotate about said secondary pivot point toward said first lever position and thereby force said pivot bar member translationally to said other of said circuit opening and closing positions in opposition to said second biasing means.

5. The control device of claim 4, wherein said second biasing means urge said pivot member translationally toward said circuit closing position, and wherein said lever is urged by said first biasing means to force said pivot bar member translationally to said circuit opening position upon engagement of said lever and stop member.

6. The control device of claim 5, wherein said second biasing means is a compressible spring extending translationally between said housing and said pivot bar member.

7. An automatic safety switch for vehicle controls having an accelerator lever rotatably mounted upon a base, and an accelerator control cable secured to the lever in such a manner as to normally bias the lever to rotate toward an idling position and to be displaced in response to selective rotation of the lever away from said idling position, said switch comprising:
   an electrical conductor pivot bar engaging said lever and carried within an opening in said base to provide a pivot for rotation of the lever relative to the base, said base opening being sufficiently large to permit limited translational movement of said pivot bar substantially along a plane containing the lever pivot axis;
   a pair of electrical conducting members secured to said base and extending into said opening at spaced locations, said pivot bar translationally movable between a position making contact with said conducting members and a position breaking contact with said conducting members;
   a spring mounted in said base opening operatively engaging said pivot bar to urge same translationally toward one of said pivot bar positions, said lever urging said pivot bar translationally to the other of said pivot bar positions in opposition to said spring upon rotation of the lever away from said idling position; and
   a stop member formed on said base on a side of said translational displacement plane opposite the side at which said cable is secured to the lever, said stop member engaging a first surface of said lever as the lever nears said idling position whereby the bias of said control cable thereupon urges said lever to rotate about the point of engagement of the lever and stop member toward said idling position, and simultaneously urges said pivot bar translationally to said other of said pivot bar positions in opposition to said spring so as to normally maintain said pivot bar at said other position when the lever is at said idling position.

8. The switch of claim 7, wherein said stop member is engageable with a second surface of said lever to limit rotation of the lever in a direction away from said idling position.

* * * * *